United States Patent [19]
Andre et al.

[11] Patent Number: 5,205,367
[45] Date of Patent: Apr. 27, 1993

[54] STACKER-CUTTER-WEIGHER

[75] Inventors: Lee R. Andre, Tecumseh; Mark E. Salemka, Adrian, both of Mich.

[73] Assignee: Wacker Silicones Corporation, Adrian, Mich.

[21] Appl. No.: 812,458

[22] Filed: Dec. 23, 1991

[51] Int. Cl.$^5$ .................. G01G 19/52; B26D 7/00
[52] U.S. Cl. .................... 177/50; 177/145; 83/77
[58] Field of Search .................... 177/50, 145

[56] References Cited

U.S. PATENT DOCUMENTS

| | | |
|---|---|---|
| 2,025,801 | 12/1935 | Cadden . |
| 2,834,388 | 5/1958 | Meyer . |
| 3,200,864 | 8/1965 | Gillman . |
| 3,204,676 | 9/1965 | Gillman . |
| 3,319,053 | 5/1967 | Roberts . |
| 3,642,046 | 2/1972 | Mathews, Jr. et al. . |
| 3,800,894 | 4/1974 | Keser et al. ............... 177/64 |
| 3,835,742 | 9/1974 | Spooner . |
| 3,995,517 | 12/1976 | Smith .................. 83/77 X |
| 4,065,911 | 1/1978 | Fagan .................. 83/77 X |
| 4,156,913 | 5/1979 | Apicella, Jr. . |
| 4,217,650 | 8/1980 | Kuchler . |
| 4,322,803 | 3/1982 | Ullner . |
| 4,416,341 | 11/1983 | Hirano . |
| 4,425,974 | 1/1984 | Kipp . |
| 4,562,917 | 1/1986 | Suzuki et al. .............. 83/77 X |
| 4,661,917 | 4/1987 | Haze et al. . |

Primary Examiner—George H. Miller, Jr.

[57] ABSTRACT

A stacker-cutter-weigher apparatus for supplying a continuous supply of a product having a preselected weight which comprises extruding a continuous stock of polymeric material having a substantially stable cross-sectional area, cutting the stock into finite sections, and placing the sections on a scale. The measured weight is sensed by a central control which adjusts the length of the next section so as to adjust the weight thereof. A further adjustment occurs as each section is placed on the scale. This provides a final product having a substantially preselected weight.

5 Claims, 1 Drawing Sheet

STACKER-CUTTER-WEIGHER

This invention relates generally to a stacker-cutter-weigher for providing a bulk product, and more specifically for providing a bulk product composed of uncured polymeric material wherein the final product has a substantially constant predetermined weight.

Many industries purchase material in bulk composed of an uncured polymer. This polymer is then used for many different purposes, such as a wire coating which is applied to the wire and subsequently cured by the user.

Due to the manner in which the material is processed, it is desirable that the user receive the packages of bulk material in substantially constant exact weights in order that it may be put to immediate use in any system without the necessity of weighing it each time it is to be used.

The common method of providing this type of material is to extrude a continuous stock of the material having a substantially stable cross-sectional area. Individuals cut this stock into finite sections so that the ultimate weight can be obtained by using a plurality of the sections. In this manner, as the sections are being processed and weighed, the individuals can cut pieces from a section or add further material to the section until it reaches the specified weight. This type of operation obviously requires an extensive amount of man-hour work and, thus, the labor costs increase the basic price at which the material can be sold.

The present invention provides a substantially automatic operation for continuously providing bulk material at a specified constant weight. This is done by cutting the bulk material into sections and obtaining a substantially continuous measurement as the sections are stacked so as to adjust the length of the section and, thus, the weight of the next section.

The invention will be more clearly understood from the following description, taken together with the drawings.

BRIEF SUMMARY OF THE INVENTION

A stacker-cutter-weigher is provided which extrudes a continuous stock of uncured polymeric material having a substantially constant cross-sectional area. The stock is cut into sections having a specific finite length and then weighed. By knowing the number of sections which will be used to make up the final bulk product, the indication of the weight of the first section may be used to determine the variations which must be made in the weight of subsequent sections in order to make the total number of slabs equal the desired weight. Thus, the information relative to the weight of the first slab is provided as information to a central controller, which uses this information to adjust the length of the next slab being cut. The second slab is then stacked on the first slab and the weighing operation is repeated and the information is sent to the controller. By using this type of control, the machine is capable of producing a bulk product of a multiple number of sections which consistently maintains a specified weight with very little, if any, variation.

DETAILED DESCRIPTION OF THE PREFERRED EMBODIMENT

Figure 1:
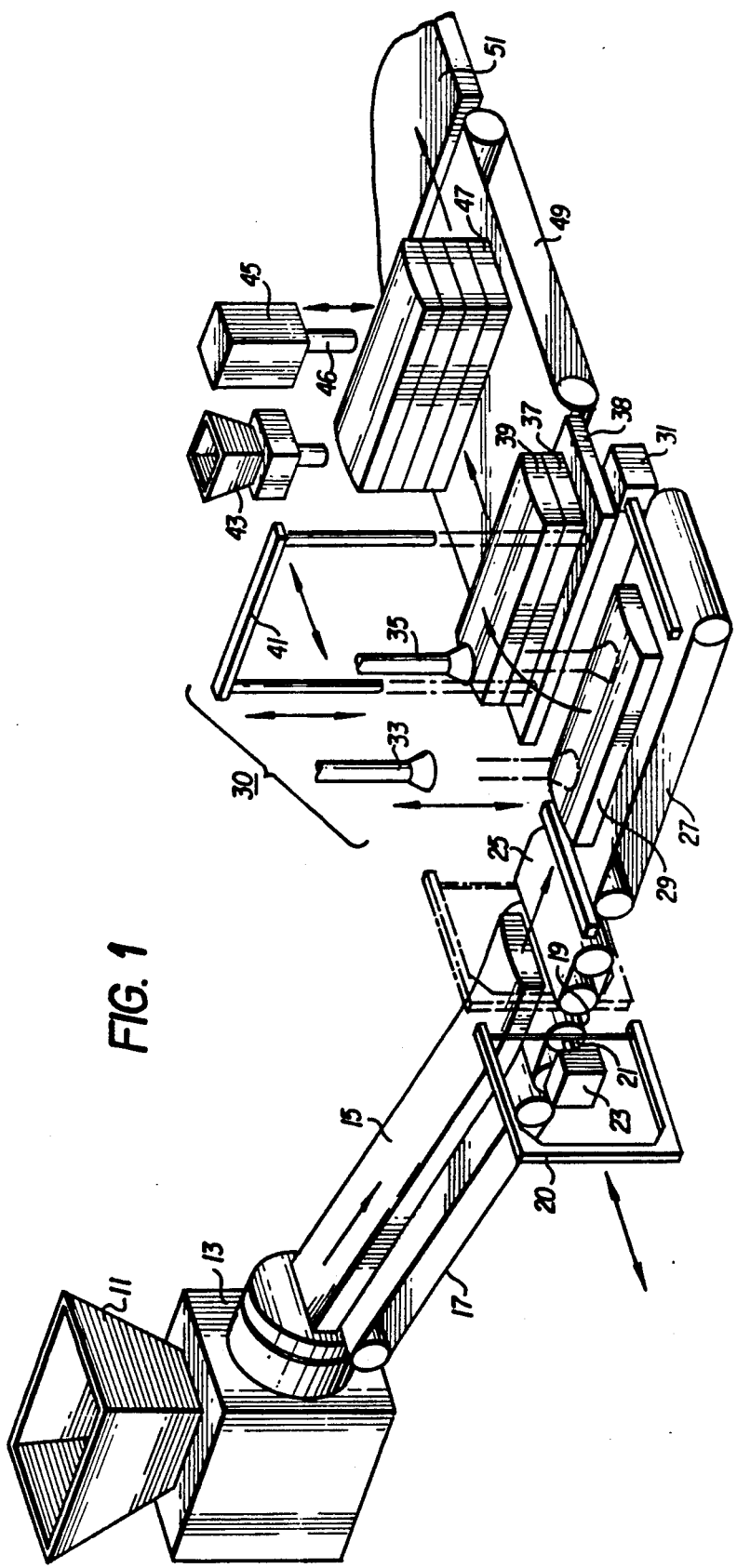
FIG. 1 is a perspective diagramatic presentation of the stacker-cutter-weigher of the present invention.

Referring to FIG. 1, bin 11 is filled with the product to be used, which is preferably an uncured polymeric material. This material is processed through extruder 13 and exits the extruder as continuous stock 15. Stock 15 is carried by conveyor 17 to cutter 20, which moves in the direction as shown by the arrows. Cutter 20 is a wire cutter which passes easily through the stock material. As stock 15 passes over reel 21, a measurement is made by measuring device 23, which gives an exact determination of the length of the stock that has passed over reel 21.

When stock 15 has reached a desired preset length, cutter 20 is actuated so as to provide a section of preselected finite length. This section is carried forward by conveyor 25 onto conveyor 27 and continues to move until it reaches sensor 31, which then stops the conveying process.

Stacker/pusher 30 comprises cups 33 and 35 which have reduced pressure therein so as to provide a suction for temporarily securing them to section 29. Suction cups 33 and 35 are then moved upwardly and horizontally so as to deposit section 29 on top of preexisting sections 37 and 39, at which time the negative pressure in the cups is terminating, releasing section 29. All of the sections are shown as resting on scale 38.

When the total number of preselected sections have been placed on scale 38, pusher 41 is lowered and moved horizontally so as to move the multiple-section package off the scale and onto conveyor 49, where it is sent for wrapping and packing.

Any type of mechanism well known in the art could be used to actuate suction cups 35 and pusher 41 and such mechanism is not shown in order to maintain the clarity of the invention as described.

Figure 2:
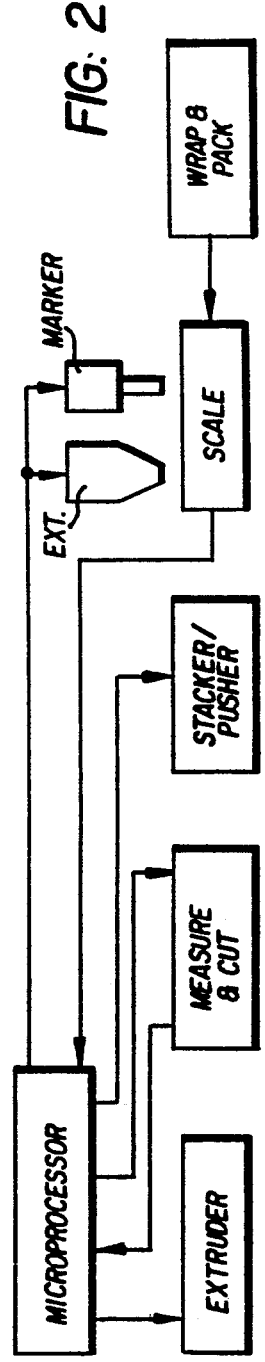
FIG. 2 is a schematic of the control system used with the apparatus of FIG. 1.

In order to explain the operation of the device, reference is made to the schematic as shown in FIG. 2.

A microprocessor is used for controlling all of the system operation so as to coordinate the various movements and supply of material. In the operation as it appears in FIG. 1, original section 37 was first placed on scale 38. The weight measurement generated by the scale was then sent to the processor to determine if the weight was above or below that fraction of the total weight which it should be. As an example, if the final bulk package is to weigh 25 pounds, and four sections comprise the final package, the ideal situation would be to have each section weigh 6.25 pounds. This, of course, rarely happens, and the first section, at least on the starting run, would likely weigh either more or less than 6.25 pounds. If the section weighs more than 6.25 pounds, this information is used by the microprocessor to control the actuation of cutter 20, depending upon the measured length of the stock material which is passed by the measuring device. Thus, if section 37 weighed more than 6.25 pounds, the length of the following section would be reduced, whereas if it weighed less than 6.25 pounds, the weight of the following section would be increased. Since the stock is made of a consistent material and is extruded at a substantially constant width and depth (cross-sectional area), the length of the section is clearly the controlling factor of the ultimate weight of the section.

Second section 39 passes through the process and is stacked on section 37 and the next weight measurement occurs. This information is sent to the microprocessor and it again adjusts the length of the following section as necessary.

In the showing of FIG. 1, third section 29 is in the process of being lifted onto the other sections, wherein the process is repeated.

For this process to work properly, it is necessary that at least two sections be used and it has been found that it is preferable to use four sections (as shown) to constitute the final product.

Obviously, and as shown in FIG. 2, the microprocessor also controls the extruding process so as to coordinate the entire operation. Additionally, there may be used a stamping marker 45 which actuates a rod 46. If the microprocessor detects that the weight of the final product is not acceptable, then the marker 45 is acuated and stamps the top section so that the operator at the wrapping and packaging point can be notified that this is not an acceptable product and it can be discarded for reprocessing.

A further option is to add an extruder 43 above the stacking point on the scales. In this instance, if the final product is underweight, the extruder can be activated by the microprocessor to deposit additional material on the multi-section package to bring it up to its proper weight.

It has been found that once operation has been initiated and a few slabs have been processed, a continuous run produces bulk weights which require little variation of individual section weights. Polymeric materials which may be used in the above-described process may include extrudable polymeric materials such as uncured silicone base polymers, polyurethanes, and epoxy resins; thermoplastics and thermosetting plastics such as polycarbonates, acrylates and methacrylate polymers; halogenated polymers such as polyvinyl chloride; and polyolefins such as polyethylene and polypropylene polymers.

The above description and drawings are illustrative only since components providing equivalent functions may be substituted for the disclosed structure without departing from the invention, the scope of which is to be limited only by the following claims.

We claim:

1. Stacker-cutter-weigher apparatus for providing a continuous supply of a product having a selected weight comprising
    means for extruding a continuous stock of polymeric material having a substantially constant cross-sectional area;
    cutter means for selectively cutting said stock into sections having a finite length;
    first conveyor means for moving said continuous stock to said cutter;
    means for measuring the length of said stock passing through said cutter;
    second conveyor means for moving each of said cut sections away from said cutter;
    a scale for measuring the weight of said sections;
    means for individually transferring each of said cut sections from said second conveyor to said scale;
    control means connected to said extruding means, said cutter means, said measuring means, and said scale means for making any necessary adjustment of the finite lengths of each additional section in response to the total weight of said previously cut sections as measured by said scale after each individual section is transferred to said scale; and
    means for removing said sections from said scale after a predetermined number of said sections have been placed on said scale.

2. The apparatus of claim 1 wherein said predetermined number of said sections is at least two.

3. The apparatus of claim 1 further comprising
    means for stamping a mark on one of said sections after removal from said scale;
    means for connecting said stamping means to said control means so that said control means actuates said stamping means when the weight of said predetermined number of said sections does not correspond to a predetermined weight.

4. The apparatus of claim 1 further comprising
    a second extruder for adding uncured polymeric material to said predetermined number of said sections while said sections are on said scale;
    means for connecting said second extruder to said control means so that said control means actuates said second extruder when said predetermined number of sections is below a predetermined weight.

5. The apparatus of claim 1 wherein the polymeric material is selected from the group consisting of extrudable polymeric materials such as uncured silicone base polymers, polyurethanes, epoxy resins; thermoplastics and thermosetting plastics such as polycarbonates, acrylates and methacrylate polymers; halogenated polymers such as polyvinyl chloride; and polyolefins such as polyethylene and polypropylene polymers.

* * * * *